H. E. WIMPERIS.
AERIAL NAVIGATION INSTRUMENT.
APPLICATION FILED DEC. 26, 1918.
1,315,065.
Patented Sept. 2, 1919.
4 SHEETS—SHEET 1.
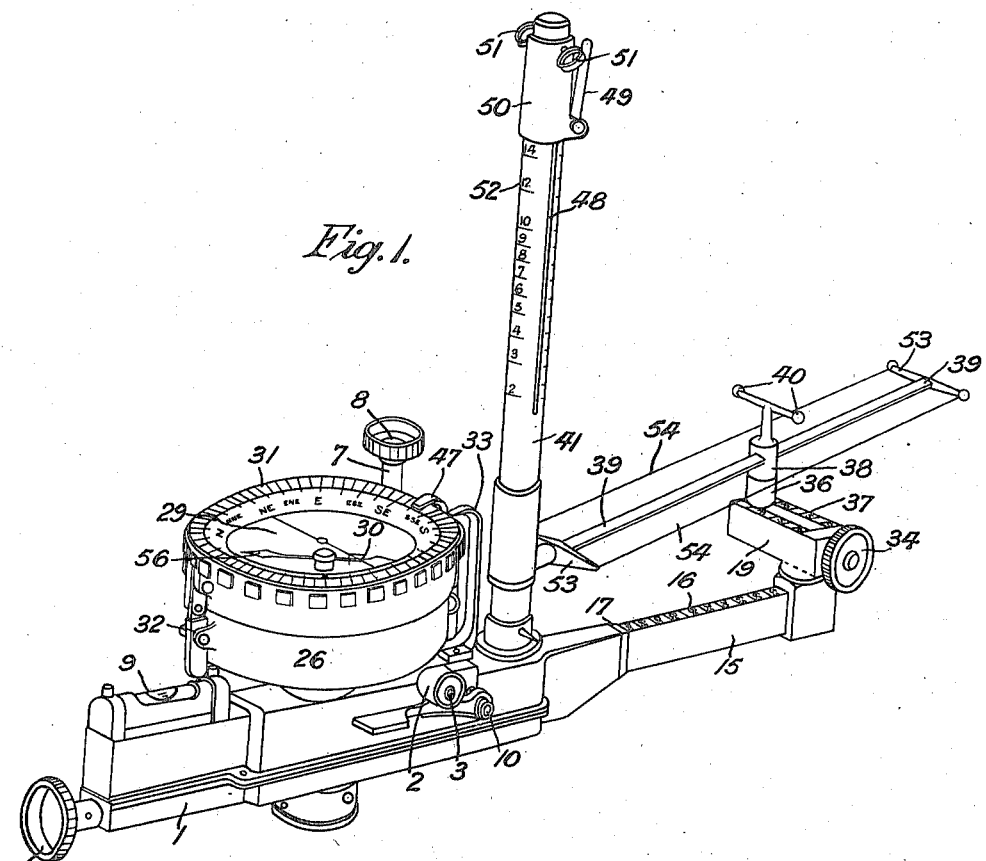
Fig. 1.
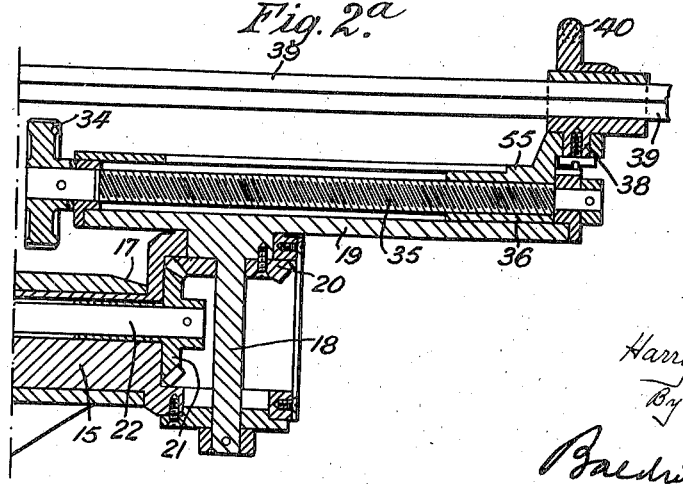
Fig. 2ª
Inventor:
Harry Egerton Wimperis,
By his Attorneys,
Baldwin & Wight

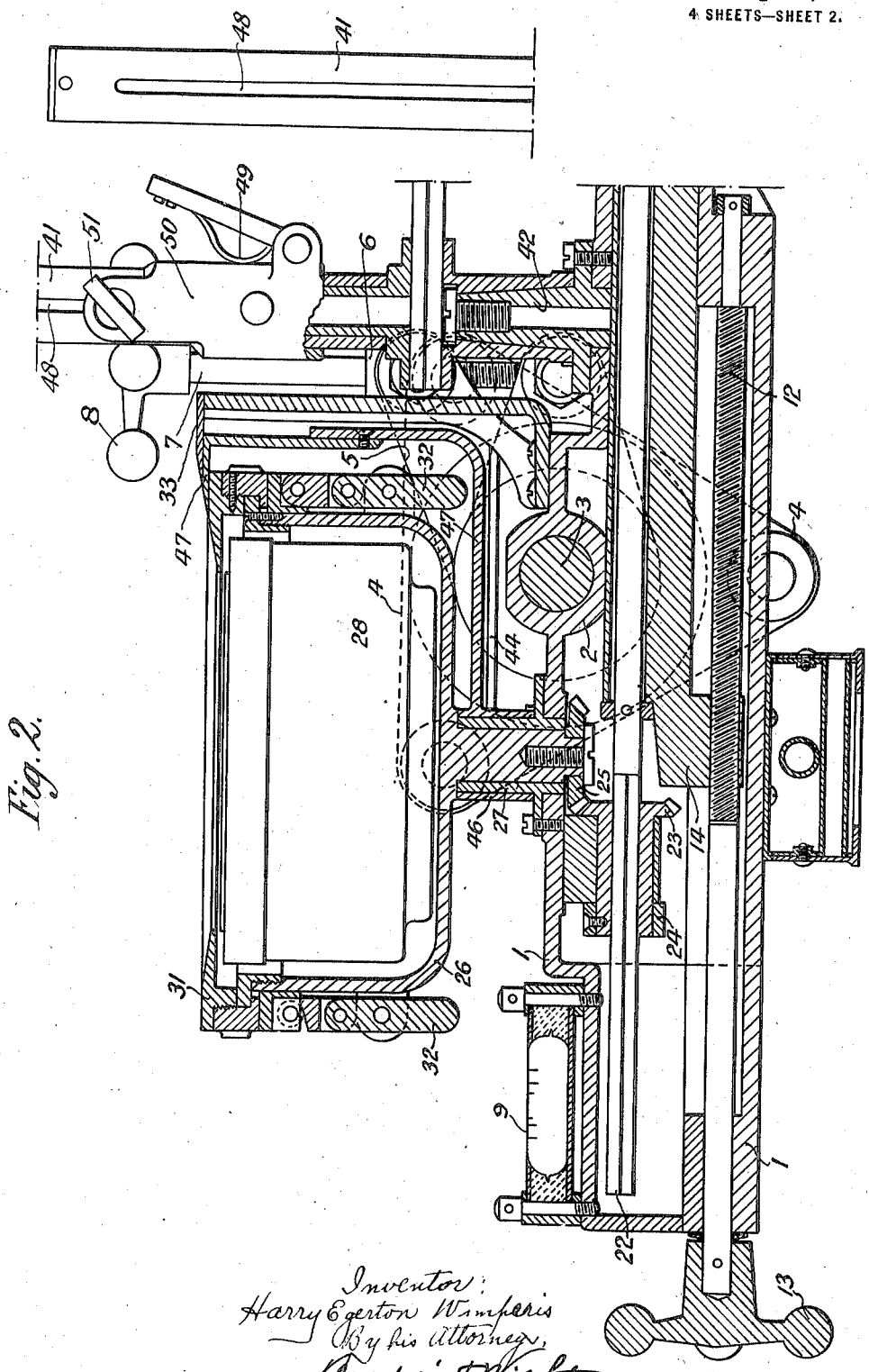

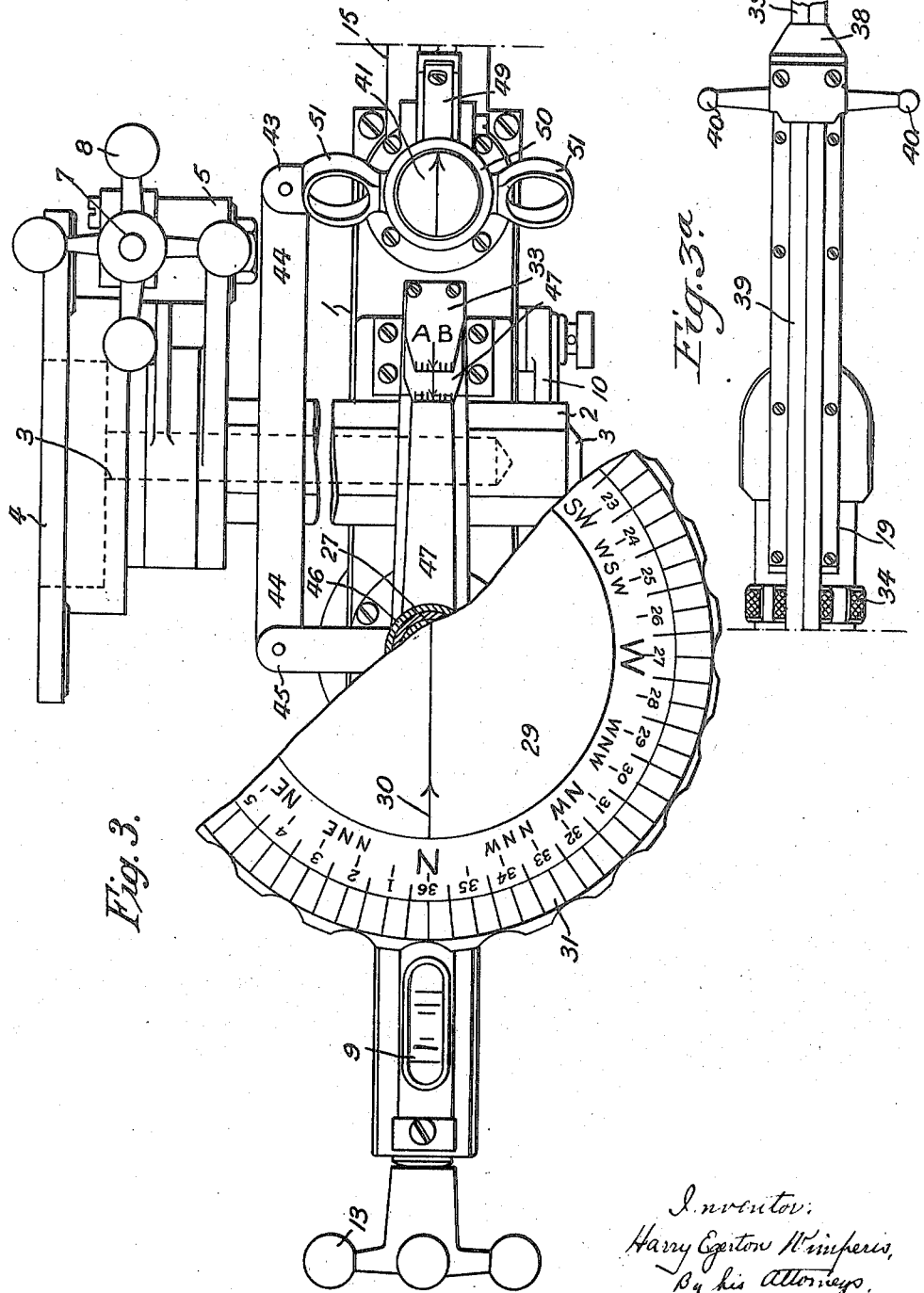

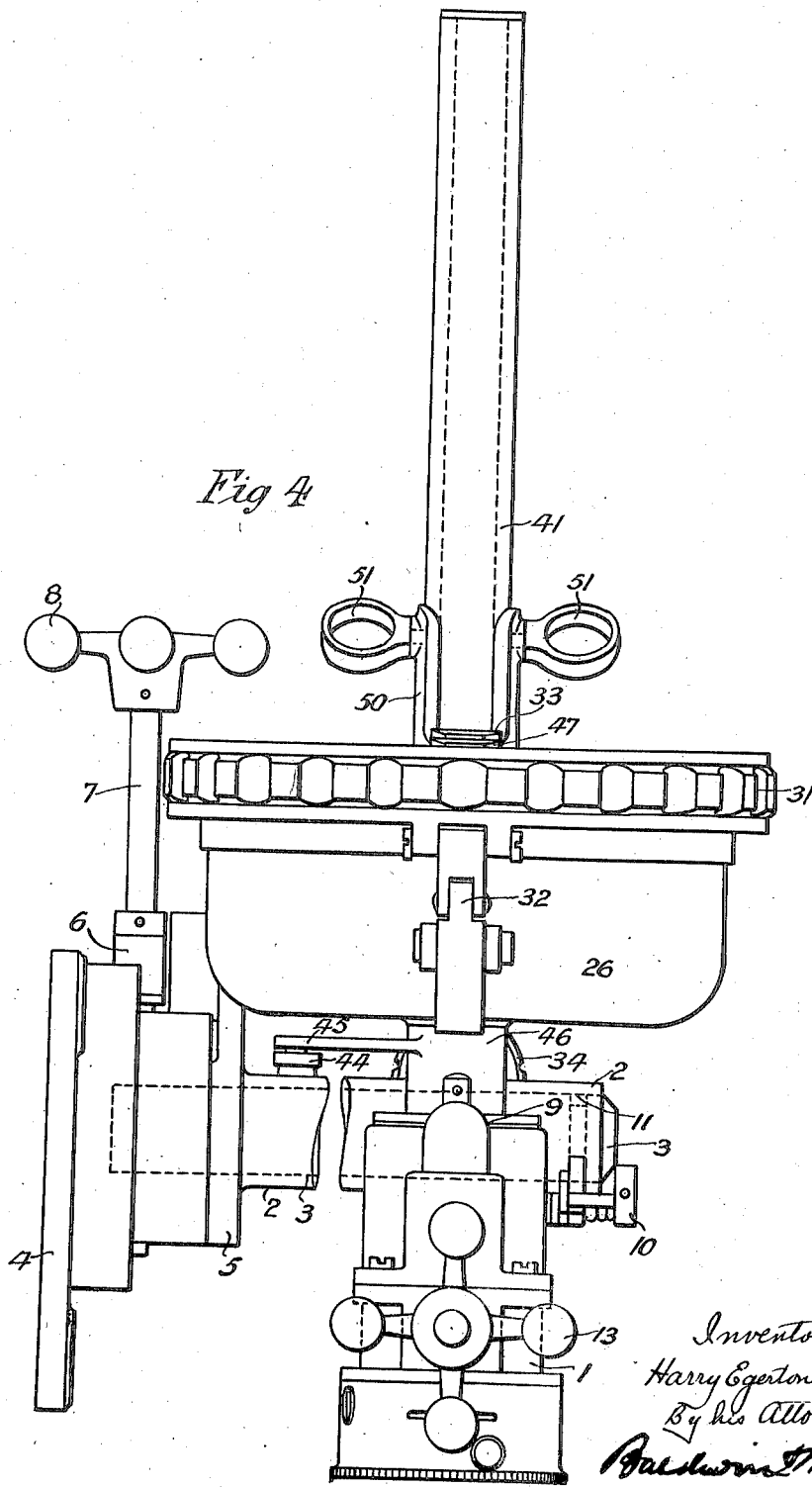

UNITED STATES PATENT OFFICE.

HARRY EGERTON WIMPERIS, OF GORING, ENGLAND.

AERIAL-NAVIGATION INSTRUMENT.

1,315,065. Specification of Letters Patent. Patented Sept. 2, 1919.

Application filed December 26, 1918. Serial No. 268,223.

*To all whom it may concern:*

Be it known that I, HARRY EGERTON WIMPERIS, a subject of the King of Great Britain, residing at The Cottage, Goring-on-Thames, England, have invented a new and useful Improvement in Aerial-Navigation Instruments, of which the following is a specification.

The object of this invention is to provide an instrument for use on aircraft by means of which the direction and velocity of the wind may be determined while the craft is in the air, the craft may be steered on a required course, making allowance for the wind, and the correct sight line for dropping a bomb upon a target may be furnished.

My invention is illustrated by the accompanying drawings, of which Figure 1 is a perspective view of an instrument embodying my invention, Fig. 2 is a longitudinal vertical section of the main part of the instrument, Fig. 2ª is a similar view of the front part, Fig. 3 is a plan of the main part, Fig. 3ª is a plan of the front part, and Fig. 4 is a rear view.

1 is the frame or body, part of which is formed as a sleeve 2 adapted to be pushed on to a pin 3 carried by a plate 4 which can be secured to the fuselage of an aeroplane. Fast with this sleeve is an arm 5 carrying a nut 6 working on a screw 7 which is mounted in the plate 4 and is provided with a handle 8 by means of which the frame 1 can be adjusted until it is level, as may be seen from a bubble 9 mounted on its rear end. 10 is a spring clip mounted on the frame and adapted to engage a recess 11 cut in the pin 3 so that the frame can be secured on the pin.

12 is a long screw mounted in bearings in the frame and provided with a hand wheel 13 by means of which it can be rotated. The frame is so mounted that the axis of the screw is parallel to the fore and aft line of the aircraft. The screw passes through a nut 14 formed on the rear end of a hollow air speed bar 15, the upper surface of which is provided with a scale 16 of air speeds which can be read against a pointer 17 on the frame.

In the forward end of the air speed bar is pivoted a stem 18 depending from a wind bar 19. Fast on this stem is a bevel pinion 20 meshing with a pinion 21 fast on a square spindle 22 which passes rearward through the bar 15 and is capable of sliding through a bevel pinion 23 which turns with the spindle in a bearing 24 secured to the frame 1. The pinion 23 meshes with a pinion 25 carried by a bowl 26 turning in a bearing 27 and inclosing a compass 28 and carrying above the compass a glass plate 29 having marked on it a "window arrow" 30 which is always parallel to the wind bar 19.

31 is a bearing ring graduated from 0 to 360 and having the principal points of the compass marked upon it. This ring can turn freely around the bowl, but can be clamped to it by toggle catches 32 when desired. The periphery of the ring is knurled so that it may be readily turned. 33 is a fixed index against which the graduations on the ring may be read.

Capable of being turned in bearings in the wind bar 19 by means of a head 34 is a screw 35 by the rotation of which a nut 36 can be moved along the bar, the upper surface of which is provided with a scale 37 of wind velocities. Pivoted in the nut 36 is a pillar 38 embracing a drift bar 39 and carrying a pair of bead foresights 40. The rear end of the drift bar is secured to an altitude pillar 41 which is rotatably mounted on a fixed pivot 42 and has fast on it an arm 43 connected by a link 44 to an arm 45 on a sleeve 46 surrounding the bearing 27 and carrying a drift bar pointer 47 which can be read against the graduations of the bearing ring 31. Thus the center line of the drift bar pointer will always be parallel to the axis of the drift bar.

Slidably mounted in grooves 48 cut in the pillar 41 and capable of being clamped thereto at any required height by means of a spring clamp 49 is a sleeve 50 carrying a pair of aperture back sights 51. The rear of the pillar is graduated with a scale 52 of altitudes so that the sleeve may be set at the graduation corresponding to the height at which the aircraft is being flown.

If preferred the drift bar may carry at its ends cross bars 53 supporting drift wires 54 parallel to the bar 39. These cross bars and wires are shown only in Fig. 1.

The methods of using the instrument are as follows, it being understood that it is so mounted on the aircraft that the screw 12 and bar 15 are parallel to the fore and aft line of the craft:—

The handwheel 13 is turned so that the graduation of scale 16 corresponding to the air speed registers with pointer 17. If the velocity and direction of the wind be known from meteorological observation, head 34 is turned until a mark or pointer 55 on nut 36 registers with the graduation on scale 37 corresponding to the velocity of the wind. Bearing ring 31 is then turned till the graduation upon it from which the wind is blowing is opposite the tail of wind arrow 30 and ring 31 is then clamped to bowl 26.

If the velocity and direction of the wind be not known, the aircraft must be flown directly up wind so that no drift is discernible. Ring 31 is clamped and ring and bowl are turned till arrow 30 is under pointer 33. Ring 31 is unclamped and turned until its N mark is over north end of compass needle 56 and ring is again clamped; the direction of wind is given by the mark on ring 31 which is now over arrow 30. The craft is now turned through about 90° port or starboard and ring is turned till N comes over north end of needle. This causes wind bar 19 and arrow 30 to point with the wind. Head 34 is then turned until the land flow is parallel to drift bar 39 and wires 54.

If it be desired to drop a bomb upon a target, the instrument is leveled by means of handle 8 and bubble 9 and sleeve 50 is clamped so that its lower edge registers with the graduation on scale 52 corresponding to the altitude of the aircraft. When a target appears the craft is turned toward it, without taking any account of the wind until drift bar 39 points toward the target, the N mark of ring 31 being kept constantly over the north end of needle. The craft is kept on this course so that the target continues to approach along drift bar, and when the observer using one of the back sights 51 and the corresponding foresight 40 sees the target in his line of sight he releases a bomb.

To make good a desired course, when the instrument has been set for direction and velocity of wind, ring 31 is turned until the graduation corresponding to desired course comes beneath drift bar pointer 47. Pointer 33 then points to course to be steered. This course is imparted to the pilot who steers accordingly by his own compass. If he carries out the instruction correctly the north end of needle 56 will remain below N mark on ring 31. The ground speed may now be read from the graduation on bar 39 which is beneath the rearward edge of pillar 38 supposing bar 39 is provided with a scale. Whether the drift bar is graduated or not, it is obvious that the distance between the axes of pillar 38 and altitude pillar 41 is a measure of the ground speed of the aircraft to the scale employed in graduating air speed bar 15 and wind bar 19.

When the angle between course to be steered and course to be made good is (based on an estimated wind) given before starting, it can be checked and any change in the wind allowed for thus: the instrument is set to the given figures for air speed and for direction and velocity of wind as above and ring 31 is turned till its N mark is over north end of needle. If the land flow is along bar 39, the instrument is correctly set. If, however, there be a small difference between the land flow and the line of bar 39, pillar 38 or bar 19 or both should be adjusted till land flow is along bar 39. If the difference be large, indicating that the actual wind is quite different from that for which the instrument was set, it should be reset as described above.

What I claim is:—

1. In an aerial navigation instrument, the combination of an air speed bar, an adjustable pivot carried thereby, a wind bar mounted on the pivot, a drift bar capable of turning about a vertical axis and a pillar carried by the wind bar and capable of sliding along the drift bar and of being adjusted on the wind bar for wind velocity.

2. In an aerial navigation instrument, the combination of a frame, an air speed bar, means for moving the bar longitudinally in the frame, a pivot carried by the bar, a wind bar mounted on the pivot, a pillar carried by the wind bar, means for moving the pillar along the wind bar and a drift bar capable of turning about a vertical axis passing through the longitudinal axis of the air speed bar and of sliding through the pillar.

3. In an aerial navigation instrument, the combination of an air speed bar, an adjustable pivot carried thereby, a wind bar mounted on the pivot, a drift bar capable of turning about a vertical axis, a pillar carried by the wind bar and capable of sliding along the drift bar and of being adjusted on the wind bar for wind velocity, a compass, a wind arrow capable of rotation about the axis of the compass, means whereby the arrow is kept parallel to the wind bar, a graduated bearing ring capable of rotation about the aforesaid axis and means for clamping the wind arrow to the ring.

4. In an aerial navigation instrument, the combination of a frame, an air speed bar, means for moving the bar longitudinally in the frame, a pivot carried by the bar, a wind bar mounted on the pivot, a compass bowl pivoted on the frame, a compass within the bowl, a wind arrow carried by the bowl, gearing connecting the wind bar and the bowl, a graduated bearing ring capable of rotation around the bowl, means for clamping the ring to the bowl, a pillar carried by the wind bar, means for moving the pillar along the wind bar and a drift bar capable of turning about a vertical axis passing through the longitudinal axis of the air speed bar and of sliding through the pillar.

5. In an aerial navigation instrument, the combination of a frame, an air speed bar, means for moving the bar longitudinally in the frame, a pivot carried by the bar, a wind bar mounted on the pivot, a compass bowl pivoted on the frame, a compass within the bowl, a wind arrow carried by the bowl, gearing connecting the wind bar and the bowl, a graduated bearing ring capable of rotation around the bowl, means for clamping the ring to the bowl, a pillar carried by the wind bar, means for moving the pillar along the wind bar, a drift bar capable of turning about a vertical axis passing through the longitudinal axis of the air speed bar and of sliding through the pillar, a fixed pointer adapted to be read against the graduations on the ring, a drift bar pointer capable of turning about the pivot of the bowl, and means for causing the latter pointer and the drift bar to turn through the same angle.

6. In an aerial navigation instrument, the combination of a frame, an air speed bar, means for moving the bar longitudinally in the frame, a pivot carried by the bar, a wind bar mounted on the pivot, a pillar carried by the wind bar, means for moving the pillar along the wind bar, a foresight carried by the pillar, an altitude pillar capable of turning on a fixed axis passing through the longitudinal axis of the air speed bar, a back sight carried by the altitude pillar and capable of adjustment thereon, and a horizontal drift bar carried by the altitude pillar and capable of sliding through the first named pillar.

7. In an aerial navigation instrument, the combination of a frame, an air speed bar, means for moving the bar longitudinally in the frame, a pivot carried by the bar, a wind bar mounted on the pivot, a compass bowl pivoted on the frame, a compass within the bowl, a wind arrow carried by the bowl, gearing connecting the wind bar and the bowl, a graduated bearing ring capable of rotation around the bowl, means for clamping the ring to the bowl, a pillar carried by the wind bar, means for moving the pillar along the wind bar, a foresight carried by the pillar, an altitude pillar capable of turning on a fixed axis passing through the longitudinal axis of the air speed bar, a back sight carried by the altitude pillar and capable of adjustment thereon and a horizontal drift bar carried by the altitude pillar and capable of sliding through the first named pillar.

8. In an aerial navigation instrument, the combination of a frame, an air speed bar, means for moving the bar longitudinally in the frame, a pivot carried by the bar, a wind bar mounted on the pivot, a compass bowl pivoted on the frame, a compass within the bowl, a wind arrow carried by the bowl, gearing connecting the wind bar and the bowl, a graduated bearing ring capable of rotation around the bowl, means for clamping the bowl to the ring a pillar carried by the wind bar, means for moving the pillar along the wind bar, a foresight carried by the pillar, an altitude pillar capable of turning on a fixed axis passing through the longitudinal axis of the air speed bar, a back sight carried by the altitude pillar and capable of adjustment thereon, a horizontal drift bar carried by the altitude pillar and capable of sliding through the first named pillar, a fixed pointer adapted to be read against the graduations on the ring, a drift bar pointer capable of turning about the pivot of the bowl and means whereby a turning movement of the drift bar through an angle causes the drift bar pointer to turn through an equal angle.

In testimony that I claim the foregoing as my invention, I have signed my name this 3rd day of December, 1918.

HARRY EGERTON WIMPERIS.